United States Patent
Kumar et al.

(10) Patent No.: US 7,716,317 B2
(45) Date of Patent: May 11, 2010

(54) METHOD AND SYSTEM FOR PRESENTING A SINGLE VIEW OF CONTENT IN A HOME NETWORK

(75) Inventors: Praveen Kumar, San Jose, CA (US); Victor Zhu, Milpitas, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 990 days.

(21) Appl. No.: 11/156,495

(22) Filed: Jun. 17, 2005

(65) Prior Publication Data

US 2006/0155723 A1 Jul. 13, 2006

Related U.S. Application Data

(60) Provisional application No. 60/643,049, filed on Jan. 10, 2005.

(51) Int. Cl.
G06F 15/173 (2006.01)
G06F 15/16 (2006.01)

(52) U.S. Cl. ........................ 709/223; 709/229
(58) Field of Classification Search ............... None
See application file for complete search history.

(56) References Cited

U.S. PATENT DOCUMENTS

| | | | |
|---|---|---|---|
| 6,078,955 A * | 6/2000 | Konno et al. ............... 709/224 |
| 7,113,999 B2 * | 9/2006 | Pestoni et al. ............... 709/231 |
| 7,222,170 B2 * | 5/2007 | Garg et al. .................. 709/224 |
| 7,284,043 B2 * | 10/2007 | Feinleib et al. ............. 709/220 |
| 2001/0044275 A1 * | 11/2001 | Yamaguchi ................ 455/11.1 |
| 2002/0029256 A1 | 3/2002 | Zintel et al. |
| 2003/0046437 A1 | 3/2003 | Eytchison et al. |
| 2004/0015620 A1 * | 1/2004 | Brown et al. .................. 710/19 |
| 2004/0117429 A1 | 6/2004 | Karaoguz et al. |
| 2004/0117822 A1 | 6/2004 | Karaoguz et al. ............. 725/37 |
| 2004/0139173 A1 * | 7/2004 | Karaoguz et al. ........... 709/219 |
| 2005/0010674 A1 * | 1/2005 | Taniguchi et al. .......... 709/231 |

FOREIGN PATENT DOCUMENTS

| | | |
|---|---|---|
| CN | 1375990 A | 10/2002 |
| EP | 1429561 A2 | 6/2004 |

OTHER PUBLICATIONS

Chinese Office Action issued in Chinese Patent Application No. 200510132907.4, mailed Jun. 5, 2009 by the State Intellectual Property Office of the P.R.C. (English-language translation attached).

(Continued)

*Primary Examiner*—Patrice Winder
*Assistant Examiner*—Minh-Chau Nguyen
(74) *Attorney, Agent, or Firm*—Kenneth L. Sherman, Esq.; Michael Zarrabian, Esq.; Myers Andras Sherman LLP

(57) ABSTRACT

A system for providing single view of content in a network of devices includes a communication module that detects devices connected to the network, a directory module that discovers content in each detected device via the communication module and maintains a directory of such available content providing a single view of the discovered content for access thereto, and a content manager that provides access to the single view.

37 Claims, 3 Drawing Sheets

OTHER PUBLICATIONS

Weil, S.A., et al., "Dynamic Metadata Management for Petabyte-scale File Systems," Conference on High Performance Networking and Computing, Proceedings of the 2004 ACM/IEEE Conference on Supercomputing, Nov. 2004, pp. 1-12, IEEE Computer Society, Washington, DC, USA.

Mukherjee, A.T., "A Layered Approach to Meta-data Search in Content-addressable Storage Systems," Internet Article, 2003, pp. 1-5, XP000863946, downloaded at: URL: http://www.employees.org/~alokem/thesis/layered-approach.pdf.

European Office Action issued in EP Application No. 05 112 677, mailed on Sep. 17, 2009, pp. 1-4, European Patent Office, Berlin, DE.

* cited by examiner

METHOD AND SYSTEM FOR PRESENTING A SINGLE VIEW OF CONTENT IN A HOME NETWORK

RELATED APPLICATION

Priority is claimed from U.S. provisional patent application Ser. No. 60/643,049 filed on Jan. 10, 2005, which is incorporated herein by reference.

FIELD OF THE INVENTION

The present invention relates to networking in general, and to accessing content in home networks, in particular.

BACKGROUND OF THE INVENTION

Conventional systems for accessing content in home networks include mechanisms and frameworks that do so on a single-device basis. Examples include frameworks such as Universal Plug and Play (UPnP), HAVi, Jini, and Microsoft-compatible networks (e.g., Samba). Features of these frameworks include dynamic discovery of devices and content on the network, and support for a wide range of device and content types.

Such conventional systems have several shortcomings however. For example, in order for a user to access content in a network, the user must be aware of which devices are connected to the network, and which content is resident on which device. Similarly, software developers who wish to write applications must be aware of all or a subset of content in the network such as an audio jukebox. Software developers must implement their applications in a way that must account for the different types of devices that may be connected, the actual instantiations of the devices, and the semantics for browsing and searching these using the devices' directory and communication-related protocols. Likewise a user must manage duplicates and backing up of data, and the like.

BRIEF SUMMARY OF THE INVENTION

The present invention addresses the above shortcomings. In one embodiment the present invention provides a method and system for presenting a single view of content in a home network.

Accordingly an example system for providing a single view of content in a network of devices according to the present invention comprises: a communication module that detects devices connected to the network; a directory module that discovers content in each detected device via the communication module and maintains a directory of such available content; and a content manager that provides a single view of the discovered content for access thereto. In case of multiple contents among the discovered devices, the directory module designates a single copy as a primary copy. The communication module further detects connection of new devices to the network and notifies the directory module such that the directory module further discovers content of said new devices and updates the directory as to availability of the newly discovered content. The content manager further provides information about the newly available content in said single view. The communication module further detects disconnection of devices from the network and notifies the directory module such that the directory module updates the directory to indicate that content in the disconnected devices is no longer available. The content manager further indicates the newly unavailable content in said single view.

Such a system eases processes that users and software developers' programs must perform to access content by providing a single view of all content on the network, which hides the underlying devices and the underlying semantics and protocols associated with accessing these. Further, it manages and maintains content metadata in the network to allow users to use content regardless of where on the network the content resides. For example, the present invention can store additional metadata associated across content, including content groupings and users' preferences. In addition, the present invention can mask storage management which is usually performed by the user so that tasks such as finding duplicate content, similar content with different qualities or formats and managing backups of content are undertaken solely by the system without the user's regard.

These and other features, aspects and advantages of the present invention will become understood with reference to the following description, appended claims and accompanying figures.

DETAILED DESCRIPTION OF THE INVENTION

In one embodiment the present invention provides a method and system for presenting a single view of content in a home network that eases the processes which users and software developers must perform in order to access content resident on a home network. Such a method and system also provides home network client applications and users with a single, system-wide view of content resident on the home network. Such a method and system further hides the entities within the network which provide the contents, and hides the varying directory and communication-related semantics and protocols (heterogeneity) associated with entities resident on the network which provide the contents. The present invention further allows managing content and content metadata in the home to avoid users' need to care about locations, duplicates, backup and other storage considerations.

Figure 1:
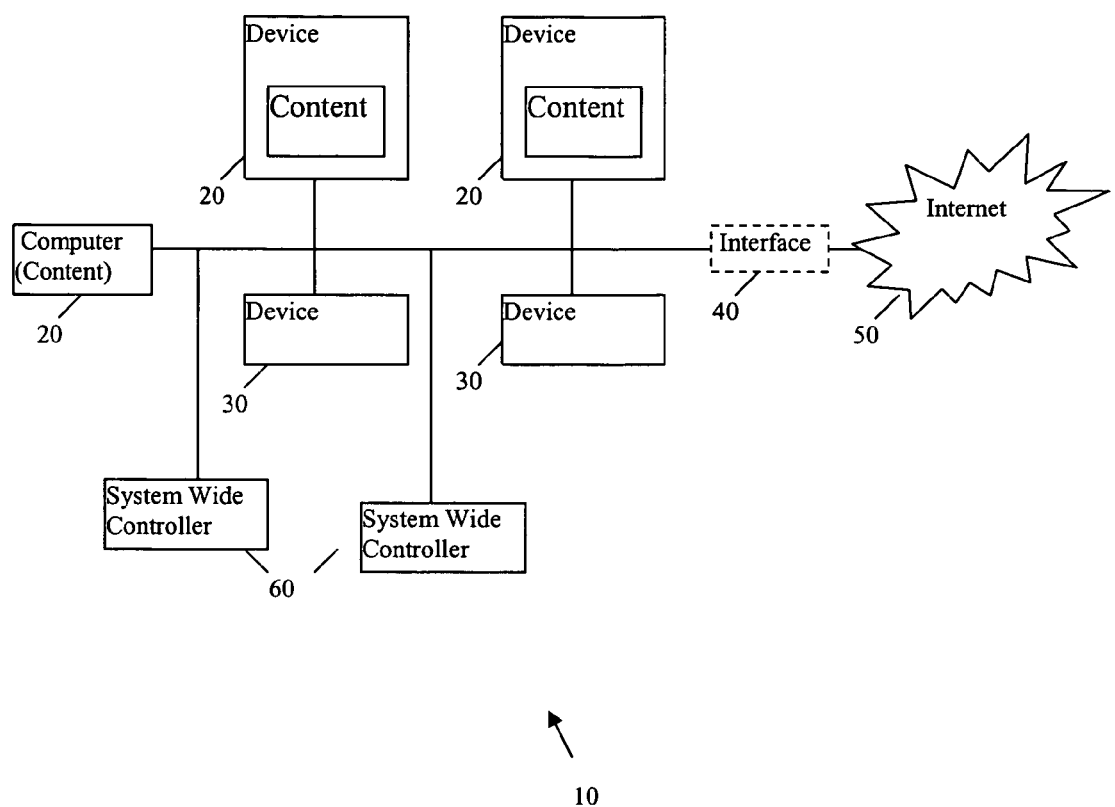
FIG. 1 shows an example home network in which an embodiment of the present invention is implemented.

FIG. 1 shows an example functional architecture of a network 10, such as a home network, that implements a single view scheme according to an embodiment of the present invention. The network 10 comprises devices 20 (e.g., servers that contain contents) and devices 30 (e.g., clients that access contents via a System Wide Controller), and optional interface 40 that connects the network 10 to another network 50 (e.g., another home network, the Internet, etc.). Though the devices 20 and 30 are shown as separate, a single physical device can include one or more client devices and one or more server devices. The devices 20 and 30, respectively, can implement the HTTP protocol for communication and protocol therebetween. Though in the example described herein the HTTP protocol is utilized by the network 10, those skilled in the art will recognize that the present invention is useful with other network communication protocols that utilize the client-server model. An example device 20 can be a VCR, DVD, computer, etc. Further, an example client device 30 can be a TV, computer, etc. The network 10 further includes at least one System Wide Controller (SWC) 60 that allows presenting a single view of content in a home network according to the present invention, described hereinbelow.

Figure 2:
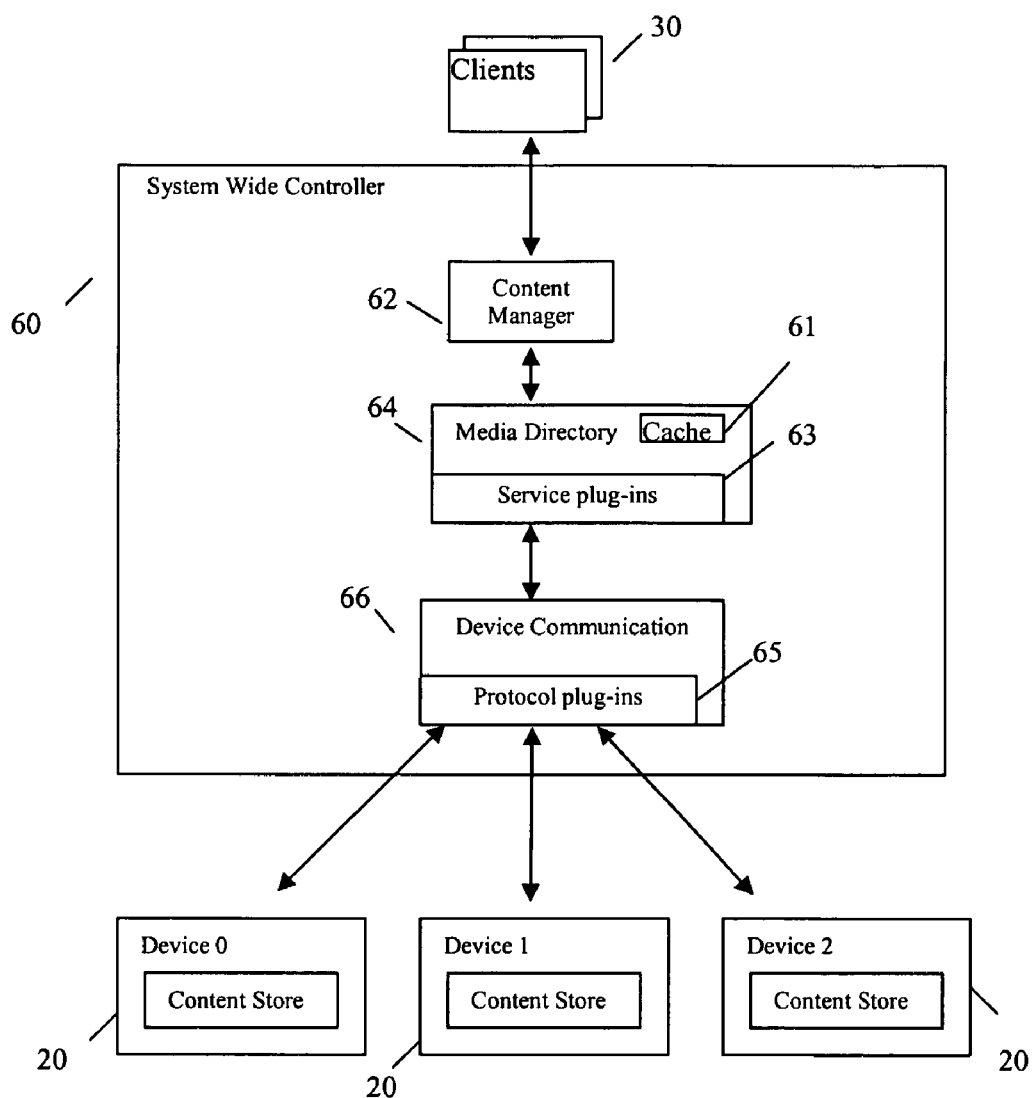
FIG. 2 shows an embodiment of a system wide controller (SWC) in a network according to the present invention.

In one implementation shown by the functional block diagram in FIG. 2, the SWC 60 comprises a device with sufficient processing capability to provide support for managing and maintaining the single view of the content resident on the home network 10. In one example, the SWC 60 includes layered software components, whereby the SWC 60 dynamically detects the appearance and disappearance of devices (e.g., devices 20, 30, etc.) and their content to and from the network 10, and resolves duplicate content found among such devices. Using a plurality of programmatic interfaces and mechanisms, clients query for, or register to asynchronously receive, system-wide content information from the SWC 60.

As shown in FIG. 2, the example SWC 60 comprises a Content Manager 62, a Media Directory 64, and a Device Communication module 66. The Device Communication module 66 is responsible for detecting the appearance and disappearance of devices to and from the network 10, and for communication-related functionality between the SWC 60 and such devices. Upon detecting the appearance of a device 20 on the network 10, the Device Communication module 66 assigns the device a system-wide unique device ID, and notifies the Media Directory 64, providing the device's device ID. The Device Communication module 66 in FIG. 2 also notifies the Media Directory 64 upon detecting the disappearance of a 20 device from the network 10 by providing the device's device ID to the Media Directory 64.

The Device Communication module 66 maintains awareness of commonly used device communication protocols, their semantics, and how to use these to access devices through Protocol Plug-ins 65. Using these Protocol Plug-ins 65, the Device Communication module 66 can be extended to support new device communication protocols as they appear in the future.

Each plug-in understands the transport protocol and semantics of that protocol to different standards/devices. The plug-in, does not, however, understand the service/message aspect of the protocol, since information from the plug-ins sent through the Device Communication module 66 to the Media Directory 64 is related to the services and messages particular to that protocol. The Device Communication module 66 provides an interface for accessing and invoking commands on the devices 20 (e.g., Device 0, Device 1, Device 2, etc.), which hides the details of the device's underlying device communication protocols. The Media Directory 64 uses the interface for invoking commands on those devices during the course of operations of the Media Directory 64.

As such, the Media Directory 64 is responsible for collecting, managing and maintaining metadata associated with content stored on the underlying devices 20, tracking duplicate contents among the devices 20, and providing a single view of these to the Content Manager 62. Within the context of the example network 10 system, metadata comprises data about content, and includes the content's title, artist, type (e.g., audio, video, image, etc.), length, resource URL, location within a device, and other details. The Media Directory 64 receives notifications from the Device Communication module 66 as devices 20, appear and disappear from the network 10.

Upon receiving notification of the appearance of a device on the network 10, the Media Directory 64 browses the devices 20 for content metadata by invoking commands on the device via the Device Communication module 66. By using service level plug-ins 63, the Media Directory 64 maintains awareness of commonly used directory/content protocols, their semantics and commands, and how to use these to browse devices for content. Using this second level 63 of plug-in architecture, the Media Directory 64 can be extended to support new directory/content services/messages as these appear in the future.

Note that metadata-related elements of the directory protocols may differ. For example, one directory protocol may refer to a content's "artist" using the label "author", while another may refer to the same using the label "creator". The Media Directory 64 standardizes such elements, and during the course of browsing devices, maps these elements of the varying directory protocol to the standardized form. As the Media Directory 64 browses a device (e.g., Device 0, Device 1, Device 2, etc.) and performs the directory protocol mapping, it collects a subset of each device content's metadata, including the content's title, artist, type, underlying device's deviceId, and location within the device. The Media Directory 64 generates a media item ID (i.e., mediaItemId) for the content by hashing a portion of the content's metadata, such as its title and author, and stores the metadata in an internal cache 61, indexing the metadata within the cache by the content's associated mediaItemId. The Media Directory cache 61 is used to manage metadata and provide fast access to frequently used items. Frequently used items of Media Directory cache 61 may reside in memory or persistent storage. Metadata created or stored in the Media Directory cache 61, such as across device groups or backup version information, is stored to persistent storage, such as a computer disk drive or other devices in the home network 10.

Hashing content into a unique identifier, mediaItemId, serves at least the purposes of: (1) efficiently and uniquely associating a mediaItemId with the content metadata independent of the device or address the content originated from, and (2) aiding in recognizing duplicate content within the network 10. If during the course of browsing content, the Media Directory 64 generates a mediaItemId which already exists in its cache 61, then the associated content must be a duplicate. The Media Directory 64 resolves duplicate content within the network 10 by designating the first encountered copy, during the course of browsing, as the "primary" copy, and designating duplicates as "secondary" copies.

Upon receiving notification of the disappearance of a device from the network 10, the Media Directory 64 updates its cache 61, removing metadata corresponding to content that was resident on the associated device. If any such metadata corresponded to the "primary" copy of duplicate content, the Media Directory 64 reassigns a "secondary" copy to be the "primary copy", and reflects the change within the associated metadata; otherwise, if any such metadata corresponded to non-duplicate content, the Media Directory 64 notifies the Content Manager 62 of the removal content from the network 10.

With content referred to by a unique content based mediaItemId, the network 10 can also recognize similar content with different secondary attributes, such as source, quality and format. In addition, the unique content based mediaItemId enables the system to manage content based on the data itself. Backing up data requires that each unique media is stored in multiple locations (e.g., on two PVRs in the network 10). That content is accessed through one mediaItemId, such that if either copy disappears, the backup copy is automatically accessed.

The Content Manager 62 is responsible for providing clients 30 (e.g., user devices) with a single, managed-view based interface to content in the network 10. As content or its associated state is updated within the network, the Media Directory 64 determines requests from the clients 30 and also whether the requested content is still present in the network 10. The Content Manager 62: (a) manages the content represented by the Media Directory 64 to backup (e.g., place the content in two or more locations with the same mediaItemId), (b) synchronizes (e.g., copy to a transient device) and (c) transcodes (e.g., change the format for rendering on a particular device).

The above are only three examples of content management by the Content Manager 62, and many other are possible. In managing clients 30, the Content Manager 62 gives all clients 30 the same, single view of content, regardless of the source of changes to the content in the network 10. The Content Manager 62 also allows clients 30 to choose to interact with the Content Manager 62 synchronously (e.g., content is returned as the result of a call) or asynchronously (e.g., content is sent to clients 30 when available, without clients 30 making a call to Content Manager 62).

Figure 3:
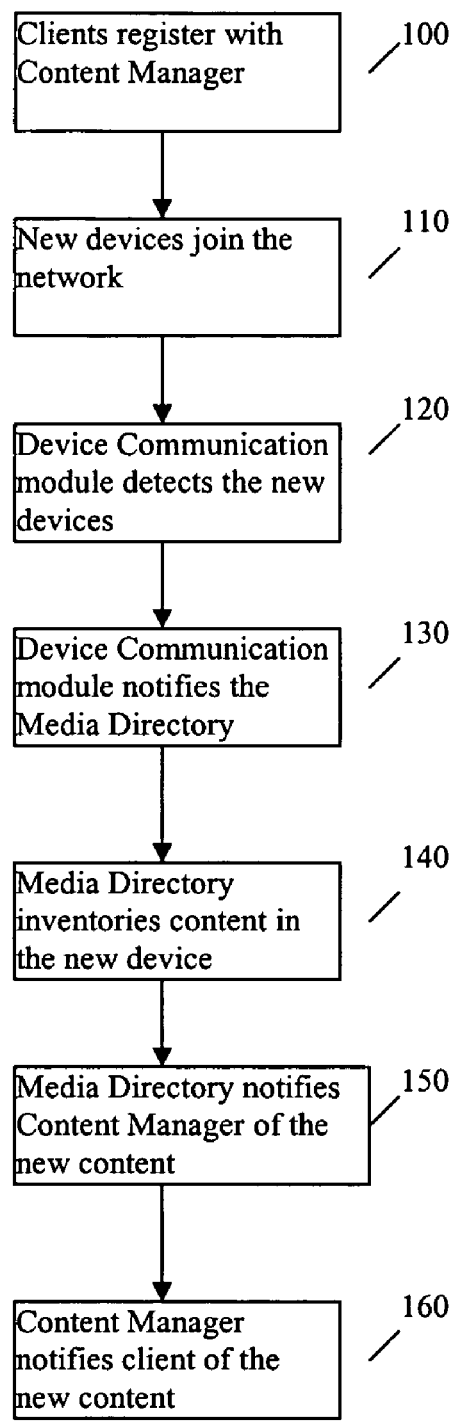
FIG. 3 shows a flowchart of the steps performed by the SWC in FIG. 2.

FIG. 3 shows a flowchart of example steps for the components of the SWC 60 interacting with one another, with clients 30, and with the devices 30 in FIG. 2. Referring to FIG. 3:

1. Step 100: Client 30 registers with the Content Manager 62 to receive system-wide information on content located on the network 10.

2. Step 110: The devices 20 (e.g., Devices 0-2), located in different locations within a home, and utilizing different communication and directory protocols, join the home network 10.

3. Step 120: The Device Communication module 66 detects the appearance of Devices 0-2 to the network 10.

4. Step 130: The Device Communication module 66 notifies the Media Directory 64 of the appearance of the Devices 0-2.

5. Step 140: The Media Directory 64 browses content located on Devices 0-2, via the Device Communication module 66, performing directory protocol mapping and updating its cache 61 of metadata associated with the content. If the Media Directory 64 encounters duplicate content among multiple devices, it notes the content as such within the associated metadata; a single copy of duplicate content is designated as the "primary" copy, and the remaining as "secondary" copies.

6. Step 150: The Media Directory 64 notifies the Content Manager 62 of the addition of new, non-duplicate content to the network 10.

7. Step 160: The Content Manager 62 notifies the clients 30 of the addition of new content to the network 10, providing a subset of the metadata associated with these.

Thus, the clients 30 have a single system-wide view of content resident on the network 10.

The single SWC 60 in FIG. 2 shows that when duplicate content exists in the network 10, the clients 30 are notified of the "primary" copy, which is the first encountered copy of duplicate content. In an alternative embodiment, the SWC 60 may use other criteria to designate the "primary" copy, and may reassign the "primary" copy as further duplicates are found, based on such criteria. The criteria may factor in one or a combination of the properties of the duplicate content including its quality, location within the network 10, or others which may affect the presentation or end-user experience of the content.

Further, in FIG. 2, the Media Directory 64 notifies the Content Manager 62 of new content at the conclusion of performing a device browse. In an alternative embodiment, the Media Directory 64 may notify the Content Manager 62 of newly added content while it is browsing. This can aid in more quickly and incrementally notifying the Content Manager 62, and in turn the clients 30, of newly added content, accommodating for slower and/or larger underlying devices for which browse operations are lengthy. This can improve the end-user experience.

In an alternative embodiment, the Media Directory 64 may support the creation of content groupings (e.g., playlists, groupings by artist, genre, etc.), and may generate notifications to the Content Manager 62 (and in turn clients) upon changes to content groupings. Such groupings would encapsulate relevant content across devices 20 and their underlying communication and directory protocols; such powerful functionality is enabled by the single view of content made possible according to the present invention.

In another alternative embodiment, the Media Directory 64 may contain digital rights management (DRM) functionality, or interact with a component that provides such functionality, and enforce configured policies by modifying the single view of content on a per-user basis. In yet another alternative embodiment, the concept of presenting a single view of system resources can be applied to aspects other than content, such as device preferences, user preferences, user data, etc.

Further, as shown in FIG. 1, multiple SWCs 60 may be present on the network 10. The SWCs 60 may communicate, coordinate, and synchronize among one another to distribute the load associated with maintaining the single view, and provide reliability-related functionality. This can be achieved by replicating any non-recoverable data (e.g. mappings) to other peer SWCs 60. Further, as shown in FIGS. 1 and 2, a client 30 may itself include content that the SWC 60 keeps track of. As such, not only a client 30 may be a sink for content of other devices in the network 10, but also the client 30 may be a source of content for other devices in the network 10.

Accordingly, the present invention eases processes that users and software developers' programs must perform to access content by providing a single view of all content on the network, which hides the underlying devices and the underlying semantics and protocols associated with accessing these. Further, it manages and maintains metadata in the home to allow users to use content regardless of where on the network the content resides. For example, the present invention can store additional metadata associated across content, including content groupings and users' preferences. In addition, the present invention can mask storage management which is usually performed by the user so that tasks such as finding duplicate content, similar content with different qualities or formats and managing backups of content are undertaken solely by the system without the user's regard. In general, the Media Directory 64 provides a single view, and Content Manager 62 provides access to the single view.

The present invention has been described in considerable detail with reference to certain preferred versions thereof; however, other versions are possible. Therefore, the spirit and scope of the appended claims should not be limited to the description of the preferred versions contained herein.

What is claimed is:

1. A system for providing a single view of content in a local home network of devices, comprising:

a system wide controller coupled to a memory, the system wide controller including:

a communication module that detects devices connected to the local home network, including existing devices and newly connected devices in the local home network;

a directory module that discovers content in each detected device via the communication module and maintains a directory of such available content metadata, providing a single view of the discovered contents for access thereto wherein in case of multiple copies of content among the detected devices, the directory module designates a single copy as a primary copy whereby the single view hides duplicates in the local home network; and a content manager that provides access to the single view.

2. The system of claim 1 wherein the communication module further detects connection of new devices to the local home network and notifies the directory module such that the directory module further discovers content of said new devices and updates the directory as to availability of the newly discovered content.

3. The system of claim 2 wherein the content manager further indicates the newly unavailable content in said single view.

4. The system of claim 3 wherein the communication module further assigned a unique identifier to a detected device and provides the unique identifier to the directory module.

5. The system of claim 4 wherein the communication module further includes device protocol functions for communication with various devices.

6. The system of claim 5 wherein the communication module provides an interface for interacting with the detected devices in the local home network.

7. The system of claim 6 wherein the directory module uses said interface for interacting with the detected devices.

8. The system of claim 7 wherein the directory module further maintains metadata in said directory about content discovered in each detected device.

9. The system of claim 8 wherein the directory module further generates identification information for the discovered content by hashing a portion of the metadata corresponding to that content and stores the metadata in memory.

10. The system of claim 9 wherein the directory module further indexes the metadata in said memory to provide fast access to frequently used content.

11. The system of claim 10 wherein the content manager further manages clients to determine their content requests.

12. The system of claim 11 wherein the content manager provides said single view regardless of the source of the content.

13. The system of claim 12 wherein the media directory further manages clients to determine their content requests.

14. The system of claim 13 wherein the media directory provides said single view regardless of the source of the content.

15. The system of claim 8 wherein said metadata includes content type and location.

16. The system of claim 8 wherein the directory module maps differing metadata protocols into a standardized form.

17. The system of claim 2 wherein the content manager further provides information about the newly available contents in said single view.

18. The system of claim 17 wherein the communication module further detects disconnection of devices from the local home network and notifies the directory module such that the directory module updates the directory to indicate that content in the disconnected devices is no longer available.

19. The system of claim 1, wherein the directory module is maintained within the local home network.

20. The system of claim 1, wherein the detected devices are consumer electronic devices within the local home network.

21. A method of providing a single view of content in a local home network of devices, comprising:
    detecting devices connected to the local home network;
    automatically discovering content in each detected device;
    maintaining a directory of such available content metadata;
    providing a single view of the discovered content using the directory such that in case of multiple copies of content among the discovered devices, a single copy is designated as a primary copy whereby the single view hides duplicates in the local home network; and
    providing access to the single view.

22. The method of claim 21 further including detecting disconnection of devices from the local home network and updating the directory to indicate that content in the disconnected devices is no longer available.

23. The method of claim 22 further including indicating the newly unavailable content in said single view.

24. The method of claim 23 further including assigning a unique identifier to a detected device and providing the unique identifier for directory update.

25. The method of claim 24 further including providing an interface for interacting with the detected devices in the local home network.

26. The method of claim 25 further including said interface for interacting with the detected devices.

27. The method of claim 26 further including maintaining metadata in said directory about content discovered in each detected device.

28. The method of claim 27 further including generating identification information for the discovered content by hashing a portion of the metadata corresponding to that content and storing the metadata in memory.

29. The method of claim 28 further including indexing the metadata in said memory to provide fast access to frequently used content.

30. The method of claim 27 wherein said metadata includes content type and location.

31. The method of claim 27 further including mapping differing metadata protocols into a standardized form.

32. The method of claim 21 further including:
    detecting connection of new devices to the local home network;
    discovering content of said new devices; and
    updating the directory as to availability of the newly discovered content.

33. The method of claim 32 further including providing information about the newly available content in said single view.

34. The method of claim 21 wherein in case of multiple contents among the discovered devices, a single copy is designated as a primary copy whereby the single view hides backup copies in the local home network.

35. The method of claim 21 further including managing clients to determine their content requests.

36. The method of claim 21 further including providing said single view regardless of the source of the content.

37. A method of providing a single view of content in a local home network of devices, comprising
    detecting devices connected to the local home network;
    automatically discovering content in each detected device and maintaining a directory of such content metadata;
    in case of multiple content among the discovered devices, designating a single copy as a primary copy whereby a single view hides duplicates in the local home network of devices; and
    providing the single view of the discovered content for access to that content.

* * * * *